(12) United States Patent
Quarg (10) Patent No.: US 7,415,316 B2
(45) Date of Patent: Aug. 19, 2008

(54) METHOD AND SYSTEM FOR MODELING A STREAM OF PRODUCTS IN A MANUFACTURING ENVIRONMENT BY PROCESS AND TOOL CATEGORIZATION

(75) Inventor: Thomas Quarg, Moritzburg (DE)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 11/550,265

(22) Filed: Oct. 17, 2006

(65) Prior Publication Data

US 2007/0203606 A1    Aug. 30, 2007

(30) Foreign Application Priority Data

Feb. 28, 2006    (DE) .................. 10 2006 009 248

(51) Int. Cl.
*G06F 19/00*    (2006.01)

(52) U.S. Cl. ..................................... 700/100; 700/121

(58) Field of Classification Search .................. 700/99, 700/100, 103, 108, 121; 703/6, 13
See application file for complete search history.

(56) References Cited

U.S. PATENT DOCUMENTS

| 7,031,786 | B2 * | 4/2006 | Chen et al. ..................... 700/99 |
| 2005/0113955 | A1 * | 5/2005 | Chien ........................... 700/99 |
| 2005/0216110 | A1 * | 9/2005 | Chen et al. ..................... 700/100 |

OTHER PUBLICATIONS

Letter from German Associate.
Translated copy of the Official Communication.

* cited by examiner

*Primary Examiner*—Albert DeCady
*Assistant Examiner*—Charles R Kasenge
(74) *Attorney, Agent, or Firm*—Williams, Morgan & Amerson (57) ABSTRACT

By estimating the processing rate on the basis of capacity factors, which are classified with respect to process recipes, i.e., technology nodes, and process tool groups, a fast response to various conditions may be accomplished, thereby providing significantly enhanced flexibility in estimating the productivity and rentability of a manufacturing environment.

13 Claims, 5 Drawing Sheets

METHOD AND SYSTEM FOR MODELING A STREAM OF PRODUCTS IN A MANUFACTURING ENVIRONMENT BY PROCESS AND TOOL CATEGORIZATION

BACKGROUND OF THE INVENTION

1. Field of the Invention

Generally, the present invention relates to manufacturing processes, and, more particularly, to the modeling of product streams in a manufacturing environment, such as a semiconductor facility, in which a plurality of different product types and processes and metrology tools are handled.

2. Description of the Related Art

Today's global market forces manufacturers of mass products to offer high quality products at a low price. It is thus important to improve yield and process efficiency to minimize production costs. This holds especially true in industrial fields, in which highly complex process tools operate on complex products according to specified process parameters that may vary between different product types. A prominent example in this respect represents the field of semiconductor device fabrication, since, here, it is essential to combine cutting-edge technology with mass production techniques. It is, therefore, the goal of semiconductor manufacturers to reduce the consumption of raw materials and consumables while at the same time improve process tool utilization. The latter aspect is especially important since, in modern semiconductor facilities, equipment is required which is extremely cost-intensive and represents the dominant part of the total production costs.

As one example for a mass product, integrated circuits are typically manufactured in automated or semi-automated facilities, thereby passing through a large number of process and metrology steps to complete the device. The number and the type of process steps and metrology steps a product, such as a semiconductor device, has to go through depends on the specifics of the product to be fabricated. For example, a typical process flow for an integrated circuit may include a plurality of photolithography steps to image a circuit pattern for a specific device layer into a resist layer, which is subsequently patterned to form a resist mask for further processes for structuring the device layer under consideration by, for example, etch or implant processes, deposition processes, heat treatments, cleaning processes and the like. Thus, layer after layer, a plurality of process steps are performed based on a specific lithographic mask set for the various layers of the specified device. For instance, a sophisticated CPU requires several hundred process steps, each of which has to be carried out within specified process margins so as to fulfill the specifications for the device under consideration. Since many of these processes are very critical, a plurality of metrology steps have to be performed to efficiently control the quality of the process flow. Typical metrology processes may include the measurement of layer thickness, the determination of dimensions of critical features, such as the gate length of transistors, the measurement of dopant profiles and the like. As the majority of the process margins are device-specific, many of the metrology processes and the actual manufacturing processes are specifically designed for the device under consideration and require specific parameter settings at the adequate metrology and process tools.

In many production plants, such as semiconductor facilities, a plurality of different product types are usually manufactured at the same time, such as memory chips of different design and storage capacity, CPUs of different design and operating speed and the like, wherein the number of different product types may even reach a hundred and more in production lines for manufacturing ASICs (application specific ICs). Since each of the different product types may require a specific process flow, specific settings in the various process tools, such as different mask sets for the lithography, different process parameters for deposition tools, etch tools, implantation tools, chemical mechanical polishing (CMP) tools, furnaces and the like, may be necessary. Consequently, a plurality of different tool parameter settings and product types may be simultaneously encountered in a manufacturing environment.

Hereinafter, the parameter setting for a specific process in a specified process tool or metrology or inspection tool may be commonly referred to as process recipe or simply as recipe. Thus, a large number of different process recipes, even for the same type of process tools, may be required which have to be applied to the process tools at the time the corresponding product types are to be processed in the respective tools. However, the sequence of process recipes performed in process and metrology tools or in functionally combined equipment groups, as well as the recipes themselves, may have to be frequently altered due to fast product changes and highly variable processes involved. As a consequence, the tool performance, especially in terms of throughput, is a very critical manufacturing parameter as it significantly affects the overall production costs of the individual products. Therefore, in the field of semiconductor production, various strategies are practiced in an attempt to optimize the stream of products for achieving a high yield with a moderate consumption of raw materials. In semiconductor plants, substrates are usually handled in groups, called lots, wherein, in a frequently encountered strategy, the dispatching of a sequence of lots for a given group of process tools, in which at least a part of the manufacturing process is to be performed, is determined on the basis of the current state of the lots and the tools such that an efficient processing of the lots may be achieved. Thus, a so-called dispatch list may be established when demanded by an operator or an automated supervising system, which may describe the sequence of releasing the various lots in an attempt to obtain efficient routing of the released lots through the process flow under consideration.

Another approach for generating an efficient stream of products through a manufacturing environment is referred to as scheduling and includes the calculation of a schedule for the lots and process tools over a certain time interval or time horizon into the future. Based on the current tool and lot status and using predefined functions with respect to manufacturing specific criteria, the schedule may be "optimized," wherein, however, changes of the manufacturing environment, in terms of tool availability, process recipe changes and the like, may require frequent updating of the schedule, wherein the consideration of all relevant constraints and process criteria, such as an efficient handling of so-called re-entrant processes, in which products are repeatedly processed in the same process tools, however, at different stages of the manufacturing process, may not be efficiently handled by conventional strategies, thereby reducing the effect of the schedule for enhancing the productivity in the manufacturing environment under consideration.

Moreover, it is frequently important to estimate the investments in terms of resources, such as process and metrology tools, for a manufacturing environment on the basis of a given product entry rate in order to obtain a prediction for installing or re-installing a manufacturing environment. For this purpose, complex software tools are available that include a capacity-based model of the manufacturing environment.

Based on the given start rate of a specified product type mixture, the model may then estimate the required resources.

Figure 1:
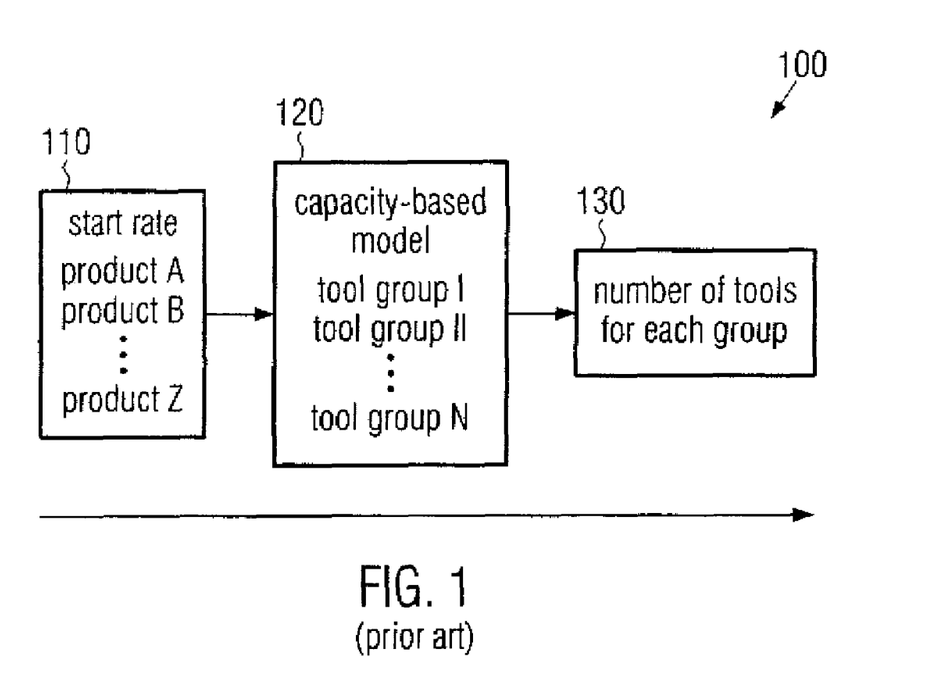
FIG. 1 schematically illustrates a process flow for estimating the number of representatives of a specific tool group for a given start rate according to a conventional technique.

FIG. 1 schematically illustrates a typical conventional flow 100 for modeling the number of process tools in a manufacturing environment, such as a semiconductor facility, on the basis of a desired production rate. In box 110, the desired start rate for one or more product types A . . . Z to be processed in the manufacturing environment under consideration may be defined. For example, in a semiconductor facility, various types of microprocessors are to be manufactured on the basis of substantially predefined process recipes. Consequently, for each individual type of microprocessor, a desired start rate, for example in the form of wafer count per time, may be entered. In box 120, the capacity-based model of the manufacturing environment under consideration may calculate, on the basis of the specific process recipes and predefined tool capacities, that is, throughput values of a process tool or tool group for a given process recipe, the resources, i.e., the number of individual tools per tool group I . . . N, required for providing the capacity of running at the desired start rate for each specified product type. Finally, the calculated capacity is output in box 130, for instance in the form a tool count for the various process and metrology tools of the manufacturing environment under consideration.

Thus, the product stream in existing or virtual manufacturing environments may be calculated on the basis of the above-described techniques. However, in some respects, these techniques may suffer from reduced flexibility with respect to efficiently determining a cost-efficient product stream, since, for example, the schedule calculation described above may require immense computational resources when a complex manufacturing environment is considered, while otherwise non-acceptable simulation intervals may be needed, which significantly reduce the applicability of these techniques with respect to increasing efficiency of resources of a manufacturing environment. On the other hand, the strategy described with reference to FIG. 1 may not allow the direct deduction of a product entry rate that would be supported by a given resource capacity, such as a given equipment set. In order to obtain a corresponding estimation of a supported start rate, a plurality of simulation runs on the basis of different product start rates may have to be performed in an attempt to get a result from the model that is identical or at least close to the given tool count. Moreover, when a moderately complex mixture of product types is to be processed in the manufacturing environment, a corresponding large number of variables may have to be varied for the various simulation runs, thereby rendering this technique less attractive due to the moderately long simulation times.

In view of the situation described above, there is therefore a need for a technique that enhances the efficiency of a production process while avoiding or reducing one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present invention is directed to a method and a system for estimating resources in a manufacturing environment, such as a semiconductor production plant or a portion thereof, in a highly efficient manner, in that data categorization is used for relating process recipes in the manufacturing environment under consideration to the various process tool groups, each of which may comprise a plurality of equivalent tool representatives. Based on the categorization, appropriate metrics for quantifying the capacity of the plurality of process tool groups with respect to the associated process recipes may be determined and may be used for the simulation of the manufacturing environment in order to obtain a relationship between processing rates, i.e., start rates for certain product types, and the respective available process tools in the manufacturing environment. Thus, on the basis of the above-described concept, in some illustrative embodiments, the mutual dependencies of process- and tool-related parameters, such as processing rate, tool count, tool utilization and the like, may be efficiently studied due to a fast response of the modeling process compared to conventional resource estimation techniques, in which the tool count for a specific type of process tools may only be directly obtained on the basis of a given start rate, while other dependencies have to be estimated in a time-consuming "trial and error" strategy.

According to one illustrative embodiment of the present invention, a method comprises determining a capacity factor for each combination of a process recipe and a representative of each of a plurality of process tool groups, wherein the process recipes and the process tool groups define a specified manufacturing environment, in which the plurality of process recipes is to be performed in the plurality of different process tool groups for providing different types of products according to a plurality of process sequences. Furthermore, the method comprises modeling the specified manufacturing environment for estimating a relationship between a processing rate in each process sequence and the number of representatives of each of the plurality of different process tool groups on the basis of the capacity factors.

According to another illustrative embodiment of the present invention, a resource evaluation system comprises an input section configured to enter one or more parameter values relating to a plurality of process recipes and a plurality of process tool groups of a manufacturing environment that is configured to process one or more product types according to the plurality of process sequences. The resource evaluation system further comprises a capacity weighting module containing a capacity factor for at least each pair of a process recipe and a tool group, wherein the capacity factor represents the capacity of a representative of a respective tool group being operated according to a specified process recipe. Furthermore, the system comprises a process simulator configured to determine a relationship between the number of representatives of each tool group and a processing rate of each process sequence on the basis of the capacity factors.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In general, the present invention relates to a technique for the estimation of resources in manufacturing environments which, in some illustrative embodiments, represent a semiconductor production plant or at least a portion thereof, wherein an increased degree of efficiency and flexibility is provided by the fast response of the inventive systems and methods. Due to the substantially immediate return of modeling results, a variety of valuable information may be gained with respect to a specific manufacturing environment and the mutual influences of the various tool and process parameters. For this purpose, the high amount of information associated with a moderately complex manufacturing environment, as is typically required for the fabrication of complex integrated circuits, may be efficiently categorized, that is, appropriately related to each other, in order to significantly enhance the flexibility and speed of the process of modeling the manufacturing environment with respect to resources, i.e., the number of process tools required. The data categorization may be performed on the basis of tool- and process-specific characteristics for defining appropriate values or value ranges or functions, which may hereinafter be referred to as factors, which then may contain, in a substantially "reduced" fashion, information that is relevant for the estimation of the resources in the manufacturing environment.

Since the relationship between the processing rate, i.e., the starting rate of products, and the resources, i.e., the process tools wherein the definition of a process tool may include any process and metrology tool, as well as any resources for operating the same, is of high significance, as is pointed out above, the corresponding factors may be referred to as capacity factors, since these factors may contain a quantitative measure of the functional capacity of a certain type of process tool when processing products in the manufacturing environment. Based on these capacity factors, which include information relating process tool types with other manufacturing environment specific characteristics, may then be efficiently used in determining the relationship between processing rates and resources. Moreover, the relationship between processing rates and resources may be established in a highly flexible manner, in order to provide the potential for a plurality of quantitative statements regarding any parameters that are deemed relevant for estimating the manufacturing environment. For example, contrary to conventional techniques as described above, the estimation of processing rates on the basis of a given set of equipment of the manufacturing environment may be established in a more efficient manner, thereby providing the potential for efficiently determining production relevant parameters, such as the determination of an optimum product mixture, wherein a corresponding estimation may be performed on demand.

Similarly, other influences, such as tool utilization, the efficiency of scheduling and the like, may be estimated in view of the influence on production rate for any predefined tool configuration within the manufacturing environment. Thus, respective tool groups may be identified and their influence on the overall efficiency of the manufacturing environment, that is the overall throughput and the like, may be readily estimated. In some illustrative embodiments, an appropriate data categorization may be performed on the basis of individual representatives of respective tool groups or on the basis of a low number of representatives per group, which may thus allow the estimation of the influence of individual tools on the respective processing rates or other relevant parameters, which may for instance be used for deciding whether or not a specific type of process tool is to be purchased when reconfiguring the manufacturing environment. Moreover, prior to setting up a new manufacturing environment or by increasing the capacity of a manufacturing environment, the highly efficient estimation of a relationship of resources and processing rates may be used in comparing various scenarios and determining the influence of even tool groups or even individual tools with respect to their timely availability and the like. Consequently, the present invention provides a technique that enables obtaining quantitative estimations within a short time period on the basis of a desired input pattern, i.e., a desired initial condition of the environment and the start rates, which may be provided by a user, by an external control system and the like, substantially without requiring inappropriately long calculation times, contrary to conventional techniques, wherein additionally a possibility is provided to study the influence of a high number of parameters in a highly complex model reflecting the manufacturing environment under consideration.

Figure 2A:
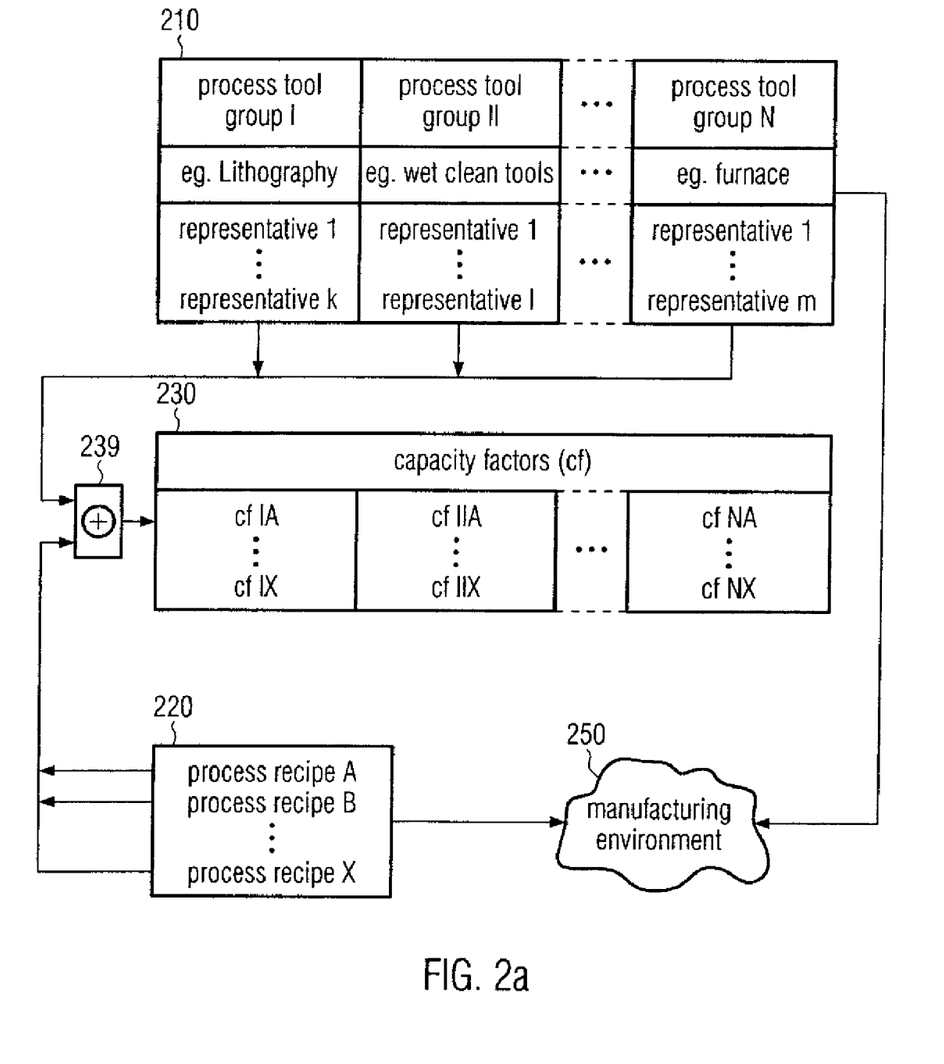
FIG. 2a schematically illustrates a manufacturing environment and a corresponding technique for data categorization for determining respective capacity factors in accordance with illustrative embodiments of the present invention.

With reference to FIGS. 2a-2e and 3, further illustrative embodiments of the present invention will now be described in more detail. FIG. 2a schematically illustrates a process flow for performing a data categorization for a specific manufacturing environment 250, which in illustrative embodiments may represent a semiconductor production plant or a portion thereof. In this respect, it should be understood that the term "semiconductor" is meant as a generic term for denoting any type of microstructural devices, such as integrated circuits, optoelectronics components, micromechanical components or any combination thereof. The manufacturing environment 250 may be defined by a plurality of process recipes 220, in FIG. 2a denoted as recipes A . . . X, which may be performed within the environment 250 on the basis of a plurality of process tool groups 210. It should be appreciated that the term "defining the manufacturing environment" in conjunction with the process recipes 220 and the process tool groups 210 is to be understood as to express the ability of the manufacturing environment 250 to process a plurality of different product types, such as semiconductor devices and the like, according to the plurality of process recipes 220 by using the process tool groups 210. It should be appreciated that this definition may not exclude any further resources, such as energy supply, the provision of consumables and the raw materials and the like, which may be included in the definition of the process tool groups if required. For example, when certain resources, such as process gases and the like, in addition to the usually required energy and the like, may not be available, the respective process tool may be set into a respective tool status, which may then be reflected by appropriate capacity-related values. Consequently, if required, the resources as represented by the process tool groups 210 may also include other components required for operating the manufacturing environment 250. The process tool groups 210 may include a plurality of individual groups, indicated as process tool group I . . . process tool group N, wherein each individual group may represent one or more substantially equivalent representatives. For example, process tool group I may represent lithography tools, wherein a plurality of representatives or members indicated as 1 . . . k may be provided for the environment 250. It should be appreciated that the representatives of the individual process tool groups may not necessarily represent single process tools but may also represent related functional blocks or clusters, depending on the desired degree of "resolution" with respect to the resources 210. Similarly, the process tool group II, including "l" representatives or members, may for instance represent process tools for performing wet cleaning processes for a specific type of cleaning process, while the process tool group N, including for instance "m" representatives may represent respective furnaces for performing specific heat treatments, deposition recipes and the like. It should be appreciated that the plurality of process tool groups 210 may actually represent a moderately high number, depending on the complexity of the process recipes 220 to be performed in the environment 250, while the number of the individual representatives may depend on the capacity of the individual tools and on the desired production rate or volume of the manufacturing environment.

The process tool groups 210 and the process recipes 220, including the plurality of process recipes A . . . X, may be "combined" or associated, as indicated at 239, so as to define resource-specific information 230, which may be provided in the form of a plurality of capacity factors (cf), which may represent numerical values representing a capacity related value depending on the process recipes 220 and the process tool groups 210. In one illustrative embodiment, the recipes 220 and the tool groups 210 may be used to define a categorization for the capacity factors 230 such that, for each pair of a process recipe A . . . X and a process tool group I . . . N, at least one capacity factor (cf IA . . . cf NX) is defined. Consequently, for the illustrative example as shown in FIG. 2a, the plurality of capacity factors 230 may comprise respective capacity factors IA . . . NA . . . IX . . . NX. In some illustrative embodiments, the individual members of the categorized capacity factors 230 may reflect the capacity of a typical representative of each of the process tool groups 210 when operated on the basis of a respective one of the process recipes 220. That is, each of the process recipes 220 may represent a specific sequence of process sub-steps to be performed in order to pass a respective product type through a process to obtain a desired process output. Consequently, each of the process recipes 220 may include a plurality of tool activities to be performed by the respective representative of a process tool group 210 to create a desired process result according to the respective recipe, wherein the plurality of tool activities determine the capacity of the tool under consideration.

Thus, for a specific process recipe, for instance recipe A, one or more types of products may have to be processed on the basis of this recipe using the process tool groups 210, wherein, in some cases, for instance for a semiconductor production plant, the process recipe A may reflect a certain technology node which is frequently characterized by a minimum critical dimension. For example, a 90 nm technology may involve the processing of field effect transistors having a gate length of approximately 50 nm and less, thereby requiring specific process recipes, process tools and process strategies in order to comply with design rules dictated by this technology node. Similarly, the recipe B may represent a 65 nm technology node, while, for instance, recipe C may represent a 90 nm technology based on silicon-on-insulator (SOI) architecture. Consequently, based on the data categorization on the basis of the process recipes 220 and the process tool groups 210, the corresponding manufacturing specific information 230 in the form of the capacity factors may include capacity related information, which correlates each process recipe with at least one representative of each of the process tool groups 210, thereby enabling an efficient modeling of the manufacturing environment 250 for estimating the mutual dependencies of the resources 210 with respect to processing rates in the environment 250. In some illustrative embodiments, the capacity factors 230 may represent the respective numerical values for the operational time for a given number of products. For instance, for a semiconductor related manufacturing environment 250, the capacity factors 230 may be provided in the form of a "1000 wafer ratio," denoting the process time for processing 1000 substrates according to a predefined process strategy.

Figure 2B:
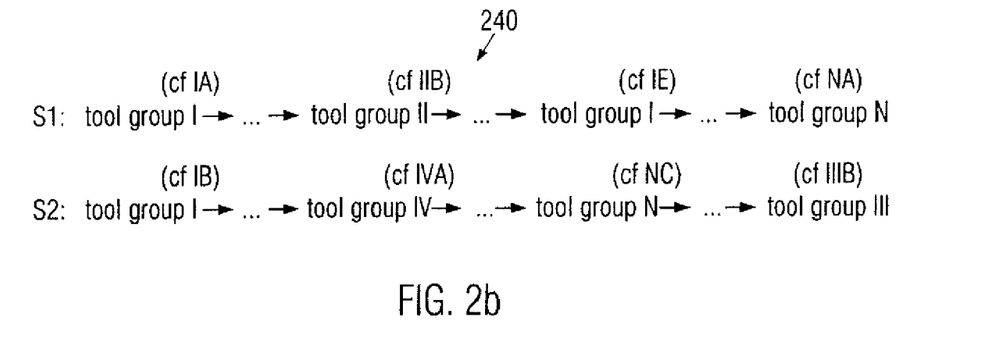
FIG. 2b schematically illustrates a plurality of process recipes correlated to respective capacity factors used for modeling the manufacturing environment under consideration according to illustrative embodiments of the present invention.

FIG. 2b schematically illustrates a model 240 of the manufacturing environment 250 on the basis of the process recipes 220, specific process sequences indicated as S1, S2 and the process tool groups 210. The process sequences S1, S2 may thus represent a series of processes performed by the respective chain of tool groups in order to obtain a specified product type at the end of the process sequence. The model 240 may comprise, for each of the sequences S1, S2, a respective "tool group chain" associated with respective capacity factors 230, as described in FIG. 2a. For example, in a simple version of the model 240, the respective sequences, such as the sequence S1, may be represented by a specific sequence of process tool groups wherein the individual capacity factors 230 related to each of the tool groups may determine the corresponding throughput or capability of a representative of respective tool groups for sequence S1 at each step, thereby including any process-specific characteristics of the process recipe to be performed. For example, for a specific step in one of the sequences S1 and S2, the respective capacity factors 230, in combination with the respective number of representatives of the specific tool group, may substantially determine the processing rate, i.e., the throughput, without considering other influences, such as queue times caused by inappropriate scheduling, tool failure and the like. Similarly, respective throughputs are obtained for all the other process tool groups involved in the respective process sequence so that a corresponding relationship between the number of representatives in each of the process tool groups and the corresponding overall throughput, i.e., processing rate, may be established, wherein the capacity factors 230 describe the tool behavior and process characteristics with respect to the process recipe under consideration. Similarly, respective processing rates may be established for any of the process sequences S1, S2 that are presently defined for the manufacturing environment 250. In some illustrative embodiments, the various process sequences S1, S2 may be handled substantially independently from each other in the model 240, thereby providing respective results in different levels or dimensions, corresponding to the number of defined process sequences S1, S2. In other illustrative embodiments, dependencies between the individual process sequences in the model 240 may be included in order to provide the potential of taking into consideration specific boundary conditions of the environment 250. For instance, the various sequences S1, S2 may be weighted according to specific criteria, such as fixed ratio of products produced in accordance with the respective process sequences, which may be accomplished for instance by appropriately weighting the capacity factors 230. It should be appreciated, however, that the model 240 may incorporate any other specific boundary conditions, depending on requirements.

Figure 2C:
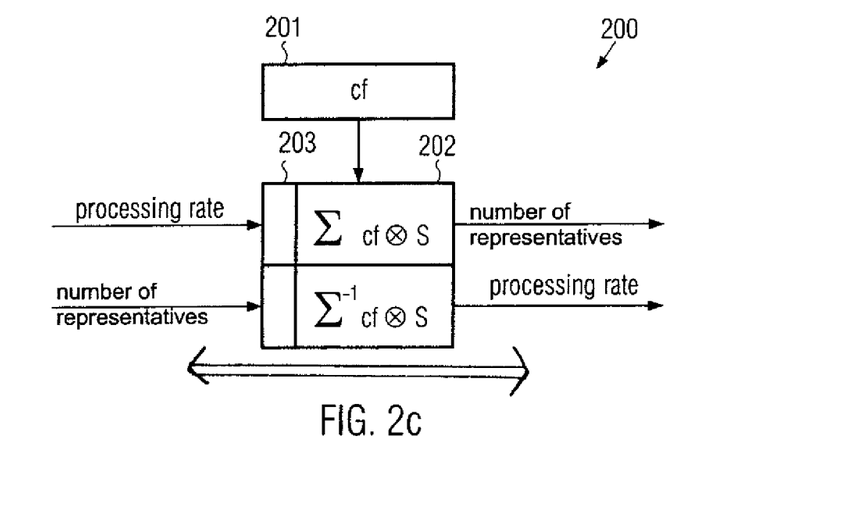
FIG. 2c schematically illustrates a system for estimating resources of a manufacturing environment on the basis of capacity factors according to illustrative embodiments of the present invention.

FIG. 2c schematically illustrates a resource estimation system 200 according to illustrative embodiments, which is configured to estimate a relationship between the number of representatives of each of the process tool groups 210 and a processing rate within the manufacturing environment 250. The system 200 may comprise an input section 203 that is configured to enter one or more parameter values related to the manufacturing environment 250, such as the processing rate, i.e., the start rate of products, such as semiconductor wafers and the like, and/or the input section 203 may be configured to receive the number of representatives of each of the tool groups 210. In some illustrative embodiments, the corresponding environment related parameter values may be input by a user on the basis of any appropriate user interface, while, in other illustrative embodiments, alternatively or additionally, the respective related parameter values may be provided by an external source in a highly automated fashion so as to provide respective estimation results on an automated basis, as will be described in more detail with reference to FIG. 3. Moreover, the system 200 may further comprise a capacity weighting module 201 configured to contain the respective capacity factors 230, as shown for instance in FIG. 2a. In other illustrative embodiments, the capacity weighting module 201 may be configured to determine the capacity factors 230 on the basis of environmental specific information, as will be described in more detail with reference to FIGS. 2d and 2e. Furthermore, the system 200 comprises a process simulator 202, which may be connected to the input section 203 and the capacity weighting module 201 and which may include an appropriate model of the manufacturing environment 250, such as the model 240, as shown in FIG. 2b. Moreover, the simulator 202 may be configured to establish a relationship between the process tool groups 210 and a processing rate, which may describe the rate of products to be processed in the manufacturing environment 250 for a steady state behavior with respect to incoming raw products and process products leaving the environment 250, including any defective devices that may have to be discarded or otherwise may have failed the specification. For instance, for a semiconductor production plant, the processing rate may be defined by the number of semiconductor wafers entering the manufacturing environment 250 without being accumulated in the environment 250. In one illustrative embodiment, the simulator 202 may establish a correlation between the processing rate and the number of representatives in such a manner that, for a given processing rate for one or more of the sequences S1, S2, a corresponding number of required process tools for each tool group 210 is output. Alternatively or additionally, the simulator 202 may be further configured to provide the processing rate for each of the process sequences S1, S2 on the basis of a predefined number of representatives of each of the process tool groups 210. In this way, the system 200 may operate "forwards and backwards" compared to the conventional technique, as described with reference to FIG. 1.

Since the simulator 202 may operate on the basis of the capacity factors 230, the corresponding calculations based on the model 240 may be performed within short time intervals, which may range from seconds to several minutes, depending on the complexity of the model 240 and the environment 250, thereby providing the potential for highly efficiently evaluating the resources of the environment 250. For example, the product mix in the environment 250, i.e., the various product types to be processed in accordance with one of the process sequences S1, S2, may be determined for a variety of different conditions. That is, the influence of a varying product mix in the environment 250 for a given set of process tool groups 210 may be readily estimated by the system 200 in order to enhance the overall efficiency of the environment 250. For instance, if a varying demand for specific product types may require a variation of the mixture of products, a corresponding prediction on a required reconfiguration of the environment 250 may be obtained by using the system 200. In other cases, the system 200 may be operated on the basis of additional optimization techniques in order to provide an optimal result for given boundary conditions. In other cases, the availability of certain tools according to a specified time schedule, for instance when the production capacity is to be increased, may be investigated in order to provide alternatives and the like. Similarly, the influence of a delay of tool delivery on the processing rate may be efficiently predicted. Moreover, the influence of tool utilization of specific process tools on the overall processing rate may be calculated on the basis of actual measurement data or assumed parameter values. Furthermore, the degree of tool utilization increase may be determined in order to determine a measure of the performance gain required for avoiding the purchase of a further representative of the respective tool group, thereby significantly contributing to the overall rentability of the environment 250, as very specific values as to the required tool enhancement of specific process tools may be obtained.

Figure 2D:
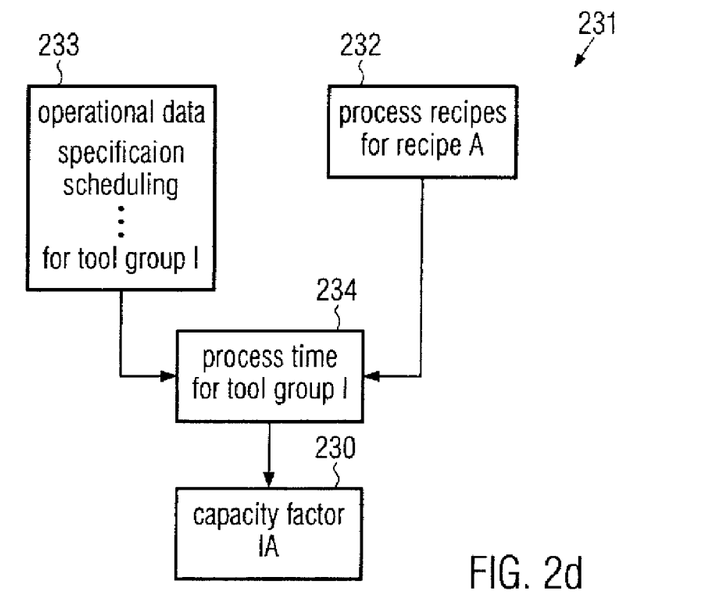
FIGS. 2d-2e schematically illustrate the process of determining appropriate capacity factors in more detail according to embodiments of the present invention.

FIG. 2d schematically illustrates a process flow 231 for determining the capacity factors 230 according to illustrative embodiments of the present invention. For convenience, it may be assumed that the capacity factor for the process recipe A with respect to the process tool group I is to be determined. For example, one or more relevant process recipes used as substantially equivalent recipes that are to be performed by representatives of the process tool group I may be obtained according to step 232, wherein, according to the data categorization on the basis of process recipes, a high degree of similarity of the process recipes may be obtained, which may be considered to determine the single recipe A when process recipe A represents a specific technology node, since here similar processes are required, irrespective of the tool hardware. For example, if the tool group I represents sophisticated lithography tools designed for lithography at extremely short wavelengths in combination with sophisticated photoresists, the corresponding exposure times, in average, may be similar for various types of products. Moreover, in step 233, other process-related or tool-related data may be obtained, such as operational data relating to specifics of the operation of the process tool group under consideration, such as empirically determined substrate handling times, averaged adjustment times and the like. In other cases, additionally or alternatively, respective specifications of the tool manufacturer may be used to determine therefrom a capacity-related metric. In still other illustrative embodiments, the scheduling of the various process tool groups may be taken into consideration, for instance by appropriate correction factors, since the effectively "seen" tool capacity may also depend on the scheduling of product handling in the environment 250. For instance, a frequent recipe change in a process tool may significantly reduce the effective tool utilization due to corresponding settling times and the like. Consequently, according to step 233, appropriate experimental or otherwise obtained data with respect to the effective tool capacity may be obtained and may be combined in step 234 with the corresponding process times as dictated by process recipes estimated in step 232. Thus, in step 234, an effective process time for the tool group I may be derived and may be used to determine an appropriate capacity factor, which substantially represents the respective tool capacity of the group I for the specific recipe A.

Figure 2E:
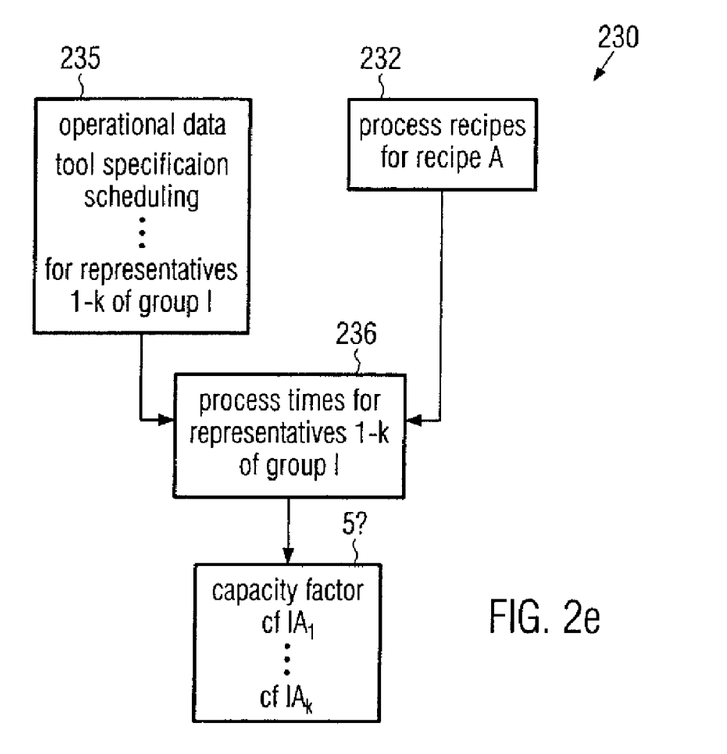

FIG. 2e schematically illustrates the process flow 231, which may produce an increased "resolution" with respect to a respective process tool group, such as the group I, wherein a corresponding capacity factor may be determined for a plurality of representatives of the respective tool group, thereby taking into consideration tool-specific differences between otherwise equivalent process tools. For example, lithography tools obtained from different manufacturers may, despite otherwise substantially identical specifications, have a different behavior under actual production conditions and thus the respective capacity factors may be different. Consequently, in step 232, the process recipes may be obtained and evaluated, wherein tool-specific recipes may be used or the general recipe A may be used, when the recipe A is determined on its process output only, and any differences in the tool behavior for achieving the result of the recipe A are incorporated in the respective capacity factor. That is, if two lithography tools produce the same output, although actually different exposure times, different handling times and the like are required, the same recipe A may be assigned to these tools, wherein the difference in throughput may then be reflected in a correspondingly different capacity factor. Similarly, in step 235, appropriate capacity values for the plurality of representatives may be obtained in a similar fashion as is previously explained. It should be appreciated that step 235 may be performed for each representative or for some of the respective group and, if only insignificant differences may be determined, one of the representatives may be selected for providing the respective data according to step 233 of FIG. 2d, or an appropriate averaged representative may be defined. In step 236, the respective information may be combined as is also explained with reference to the step 234, and finally the capacity factors 230 may be generated corresponding to the desired "tool resolution." It should be appreciated that, depending on the resolution of the tool groups and/or the individual representatives, the corresponding model 240 may be appropriately adapted in order to obtain the respective relationship between the processing rate and the respective tool groups. Seen from another point, depending on the desired resolution, the process tool groups may be refined, for instance by defining "sub groups," as required. In this way, even the influence of individual tools or very small tool groups may be estimated with respect to the processing rate, thereby allowing the identification of low-performing tools and high-performing tools, when the respective capacity factors are based on empirically obtained data. Moreover, the influence of tool utilization of individual tools or small tool groups on the processing rates may be estimated.

Figure 3:
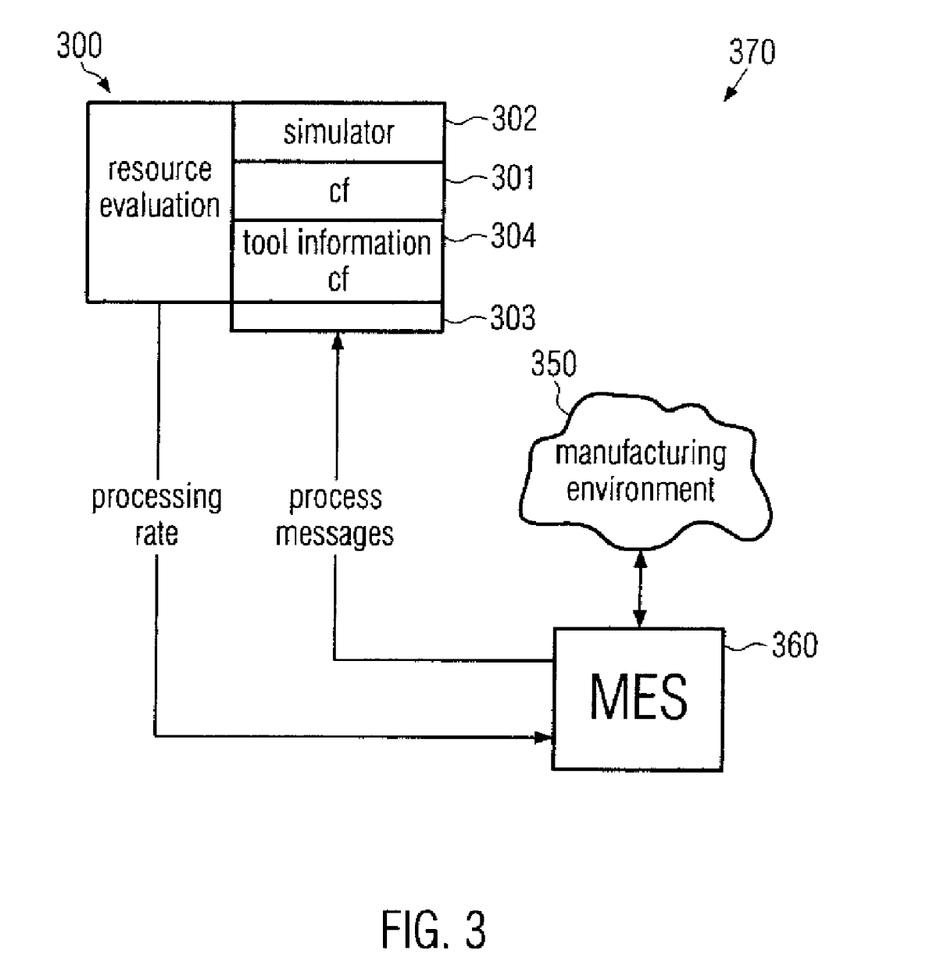
FIG. 3 schematically illustrates a manufacturing environment controlled by a supervising control system that is connected to a resource evaluation system according to still further illustrative embodiments of the present invention.

FIG. 3 schematically illustrates a system 370 that is operatively connected to a manufacturing environment 350, which may be controlled on the basis of a supervising control system, such as a manufacturing execution system (MES) 360, as is typically provided in semiconductor production plants. Furthermore, the system 370 comprises a resource evaluation system 300, which may have a similar configuration as is previously described with reference to the system 200. Hence, the evaluation system 300 may comprise an input section 303, a capacity weighting module 301 and a simulator 302. Moreover, the system 300 may comprise in some illustrative embodiments a process information extractor 304 that is connected to the input section 303 to receive therefrom process messages delivered by the control system 360. In one illustrative embodiment, the process information extractor 304 may be configured to extract the number of representatives of each of the tool groups which are currently used in the manufacturing environment 350. Furthermore, the extractor 304 may be further configured to determine an appropriate capacity factor for each of the identified process tools on the basis of the received process messages.

During operation of the system 370, the control system 360 may control the product flow within the environment 350 and may also receive process messages from the process tools in the environment 350, thereby reporting process-related data, such as tool status, substrate status and the like, to the system 360. The system 360 may forward respective process messages to the system 300, from which the extractor 304 may identify respective process tools currently used in the environment 350. For instance, the extractor 304 may receive process messages referring to the tool status of the individual process tools, thereby enabling the extractor 304 to determine whether, for instance, a process tool is idle, requires maintenance, is actually processing and the like. Moreover, the process messages delivered by the control system 360 may also indicate the various process sequences performed in the environment 350. Hence, the extractor 304 may, based on these process messages, extract currently valid capacity factors in order to estimate the processing rate for a given tool configuration, as indicated by the received process messages. The estimation of a corresponding processing rate may be performed in accordance with the principles as previously described with reference to FIGS. 2a-2e. Consequently, the control system 360 may receive the currently estimated processing rate, which may reflect the influence of the present status of the environment 350, i.e., the respective process tools therein, so that the control strategy of the control system 360 may be based on the estimated processing rate provided by the system 300. For example, if a specific tool may have an unexpected failure which may need extended maintenance or even a replacement of the tool, the system 300 and the control system 360 may determine, on the basis of the estimated processing rate, a different control strategy, for instance by changing the product mix and/or by changing the current starting rate for specific product types. Moreover, the system 300 may evaluate the efficiency of any "compensation mechanisms" for a corresponding failure of a process tool and the like by, for instance, indicating a degree of increase of tool utilization for one or more tools of the respective tool group. In this manner, the production efficiency of the environment 350 may be monitored and/or controlled in a highly efficient manner, wherein the fast response of the system 300 may provide a substantially real-time response to the current status of the environment 350.

As a result, the present invention provides a system and a method for efficiently estimating a relationship between resources, that is process tool groups, and a corresponding start rate or processing rate by modeling the respective manufacturing environment on the basis of categorized capacity factors, which in illustrative embodiments are defined for each pair of a process recipe and a respective process tool group. Thus, contrary to conventional techniques, processing rates and tool number may be calculated "backwards and forwards," thereby providing a high degree of flexibility wherein, due to the efficiency of providing the manufacturing-specific information in the form of the capacity factors, a fast response of the system is accomplished. Consequently, a high number of parameter values may be varied to obtain information on the mutual dependencies with respect to the processing rate. Hence, questions such as:

How many starts of products are supported with the currently available tool sets;

What is the optimum product mix based on demand for the available tool set;

How many process tools are needed and when; and

In a given startup scenario: what is the effect of increasing or decreasing the utilization of one or more process tools, what is the minimum required utilization to avoid or postpone the purchase of a further tool for the respective tool group and the like;

may be examined in a highly time-efficient manner. Thus, the respective response of the resource estimation system may also be used for enhancing the process control within a specific manufacturing environment.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    for a specified manufacturing environment defined by a plurality of process recipes to be performed in a plurality of different process tool groups for providing different types of products according to a plurality of process sequences, determining a capacity factor for each combination of a process recipe and a representative of each of said plurality of process tool groups;
    modeling said specified manufacturing environment for estimating a relationship between a processing rate for said plurality of process sequences and the number of representatives of each of said plurality of different process tool groups on the basis of said capacity factors; and
    determining, on the basis of said relationship, a processing rate for each of said process sequences for a given ratio between said plurality of process sequences and for a given number of representatives of each of said plurality of process tool groups.

2. The method of claim 1, further comprising determining a time progression of the number of representatives for each of said plurality of tool groups for a predefined time-varying progression of the processing rate of said plurality of process sequences on the basis of said relationship.

3. The method of claim 1, further comprising determining an optimum processing rate for each of a specified number of different product types with respect to a predefined optimization criterion on the basis of said relationship.

4. The method of claim 1, further comprising determining a correlation between tool utilization of one or more tool representatives of one or more tool groups and a total number of process tools for a given processing rate of each sequence.

5. The method of claim 1, wherein a capacity factor is determined for two or more representatives of at least one tool group.

6. The method of claim 1, wherein said manufacturing environment represents at least a portion of a semiconductor production plant.

7. A resource evaluation system, comprising:
    an input section configured to enter one or more parameter values relating to a plurality of process recipes and a plurality of process tool groups of a manufacturing environment for processing one or more product types according to a plurality of process sequences;
    a capacity weighting module containing a capacity factor for at least each pair of a process sequence and a tool group, said capacity factor representing the capacity of a representative of a respective tool group when operated according to a specified process recipe;
    a process simulator configured to determine a relationship between the number of representatives of each tool group and a processing rate of each process sequence on the basis of said capacity factors, wherein said process simulator is configured to determine, on the basis of said relationship, a processing rate for each of said process sequences for a given ratio between said plurality of process sequences and for a given number of representatives of each of said plurality of process tool groups and; a plurality of processing tools among said processing tool groups, wherein said plurality of processing tools are configured to process wafer at the processing rate.

8. The resource evaluation system of claim 7, wherein said relationship indicates at least the number of representatives of each tool group for a predefined processing rate of each process sequence.

9. The resource evaluation system of claim 7, wherein said capacity weighting module is further configured to determine said capacity factors on the basis of process information related to said manufacturing environment.

10. The resource evaluation system of claim 9, wherein said process information comprises at least one of tool capacity related data and schedule data.

11. The resource evaluation system of claim 7, wherein said process simulator is further configured to determine an extreme value of a function representing said relationship for predefined boundary conditions.

12. The resource evaluation system of claim 7, further comprising a process information extractor configured to receive process information from an external control system and determine at least the number of representatives and the capacity factors from said process information.

13. The resource evaluation system of claim 7, wherein said manufacturing environment represents at least a portion of a semiconductor production plant.

* * * * *